(12) United States Patent
Chen et al.

(10) Patent No.: US 12,416,851 B2
(45) Date of Patent: Sep. 16, 2025

(54) LENS MOUNTING APPARATUS AND PROJECTOR

(71) Applicant: Panasonic Intellectual Property Management Co., Ltd., Osaka (JP)

(72) Inventors: Ya Chen, Guangdong (CN); Chen Chen, Guangdong (CN)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 854 days.

(21) Appl. No.: 17/555,950

(22) Filed: Dec. 20, 2021

(65) Prior Publication Data

US 2022/0244482 A1 Aug. 4, 2022

(30) Foreign Application Priority Data

Jan. 29, 2021 (CN) .......................... 202110132784.3

(51) Int. Cl.
  *G03B 21/14* (2006.01)
  *G02B 7/08* (2021.01)
(52) U.S. Cl.
  CPC ............... *G03B 21/14* (2013.01); *G02B 7/08* (2013.01); *G03B 21/142* (2013.01)
(58) Field of Classification Search
  None
  See application file for complete search history.

(56) References Cited

U.S. PATENT DOCUMENTS

| | | | |
|---|---|---|---|
| 2009/0015800 A1 | 1/2009 | Igarashi et al. | |
| 2012/0195587 A1 | 8/2012 | Hasuda et al. | |
| 2016/0087365 A1 | 3/2016 | Ohkubo et al. | |
| 2019/0094565 A1* | 3/2019 | Park | H04N 23/57 |
| 2019/0141224 A1* | 5/2019 | Park | H04N 23/55 |
| 2019/0265431 A1* | 8/2019 | Ichikawa | G02B 7/021 |

FOREIGN PATENT DOCUMENTS

| | | |
|---|---|---|
| JP | 2009-20445 | 1/2009 |
| JP | 2012-155290 | 8/2012 |
| JP | 2015-11961 | 1/2015 |

* cited by examiner

*Primary Examiner* — Stephone B Allen
*Assistant Examiner* — Tamara Y. Washington
(74) *Attorney, Agent, or Firm* — Wenderoth, Lind & Ponack, L.L.P.

(57) ABSTRACT

A lens mounting apparatus includes a base including an opening, wherein a lens including a connection part is inserted and attached, an annular frame including a notch provided on a part of an outer periphery, a socket electrically connected to the connection part of the lens, and a first elastic member provided to urge the socket from the outer periphery toward a center of the annular frame. The annular frame is configured to fix the lens inserted and attached into the base by rotating the annular frame in one direction by a predetermined angle. When the annular frame does not fix the lens, the notch does not face the socket. When the annular frame fixes the lens, the notch faces the socket, and the socket is electrically connected to the connection part of the lens by an urging force of the first elastic member.

8 Claims, 12 Drawing Sheets

LENS MOUNTING APPARATUS AND PROJECTOR

BACKGROUND

1. Technical Field

The present disclosure relates to a lens mounting apparatus and a projector including the lens mounting apparatus.

2. Description of the Related Art

When a lens is mounted on a camera, a projector, or the like, it is necessary to electrically connect a lens contact of the lens and a socket contact of a socket mounted on the camera, the projector, or the like, and to fix the lens to the camera, the projector, or the like.

As a lens mounting apparatus as described above, Unexamined Japanese Patent Publication No. 2012-155290 discloses the following configuration.

In Unexamined Japanese Patent Publication No. 2012-155290, the lens contact and the socket contact are electrically connected to each other by rotating the lens after the lens is inserted into the camera in order to electrically connect the lens contact and the socket contact favorably and prevent the lens from being erroneously mounted on the camera.

Thus, the camera in Unexamined Japanese Patent Publication No. 2012-155290 has advantages that the socket has small dimensions and costs low.

However, Unexamined Japanese Patent Publication No. 2012-155290 has the following technical problems.

After the lens is inserted, the lens cannot be fixed to the camera without rotating the lens. Thus, mounting operation of the lens is inconvenient. In particular, with a lens having a large weight, elasticity of an elastic piece of a lens mount increases, a large force is required to rotate the lens, and the lens cannot be fixed firmly.

An effective stroke of an elastic contact of the socket is small, and the elastic contact of the socket is easily deformed and lost when the lens is rotated, and thus a contact failure easily occurs.

As the lens mounting apparatus as described above, in addition to a rotary mounting structure disclosed in Unexamined Japanese Patent Publication No. 2012-155290, a direct insertion mounting structure described below is also disclosed in the known art.

Specifically, in the direct insertion lens mounting structure, after the lens is inserted into a camera, a projector, or the like, the lens is not rotated, and the lens contact and the socket contact are electrically connected directly.

In this way, it is not necessary to rotate the lens after the insertion of the lens, and the lens mounting operation is convenient. After the lens is inserted, a contact failure rate at the contact decreases.

However, the known art described above has the following technical problems.

The socket, which has a large volume, makes an installation space of the lens mount narrow.

The socket needs to freely move in a narrow space such that a position of the socket does not affect positioning of the lens, and thus the socket costs high.

SUMMARY

The present disclosure has been made to solve the above-described technical problems, and an object of the present disclosure is to provide a lens mounting apparatus capable of reducing a volume of a socket, suppressing a contact failure of a socket contact, and improving mounting operability of a lens, and a projector including the lens mounting apparatus.

In order to achieve the above object, a lens mounting apparatus of the present disclosure includes a base including an opening, wherein a lens including a connection part is inserted and attached into the opening of the base, an annular frame including a notch provided on a part of an outer periphery of the annular frame, a socket electrically connected to the connection part of the lens, and a first elastic member provided to urge the socket from the outer periphery toward a center of the annular frame. The annular frame is rotatably mounted on the base. The annular frame is configured to fix the lens inserted and attached into the base by rotating the annular frame in one direction by a predetermined angle. When the annular frame does not fix the lens, the notch does not face the socket. When the annular frame fixes the lens, the notch faces the socket, and the socket is electrically connected to the connection part of the lens by an urging force of the first elastic member.

In the lens mounting apparatus of the present disclosure, the first elastic member is provided to urge the socket from the outer periphery toward the center, that is, the radial center of the annular frame. Thus, an effective stroke of the socket contact as the connection part of the socket increases, and a contact failure rate at the contact decreases.

Further, since the socket contact of the socket and a lens contact as the connection part of the lens are not in contact with each other when the lens is inserted, the socket contact of the socket can be prevented from being deformed by receiving an impact.

Furthermore, since the socket does not affect positioning of the lens, a position of the lens can be determined appropriately.

In addition, since the lens need not be rotated after the insertion of the lens, the mounting operation of the lens is convenient, and the mounting operability is improved particularly for a lens having a large weight.

Finally, since the socket is movable radially, the socket has small dimensions and costs low.

DETAILED DESCRIPTION

Hereinafter, a structure and a function of each component of the present disclosure will be described in detail with reference to the drawings. In the following description, the same or corresponding members and structures are designated by the same reference numerals, and duplicated description will be omitted.

Figure 1:
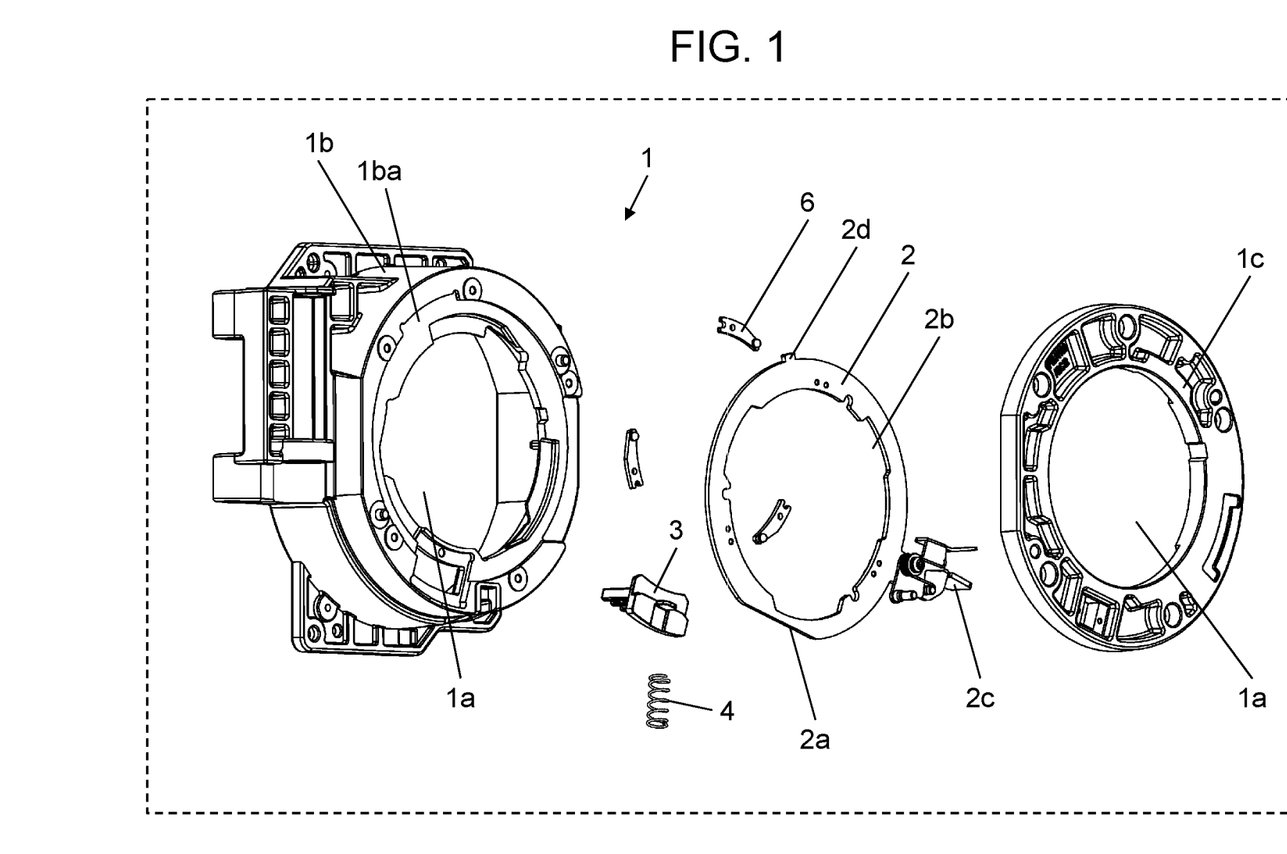
FIG. 1 is an exploded perspective view of a lens mounting apparatus of the present disclosure.

As illustrated in FIG. 1, a lens mounting apparatus of the present disclosure includes base 1 having opening 1a into which lens 5 (see FIG. 6A described later) is inserted and attached, annular frame 2 provided with notch 2a formed by notching a part of an outer periphery, socket 3 electrically connected to lens contact 5a as a connection part of lens 5, and first elastic member (for example, spring) 4 provided to urge socket 3 from an outer periphery toward a center, that is, a radial center of annular frame 2. Here, lens 5 is a projection lens used in a projector described later. Note that illustration of the lens is omitted in FIG. 1.

Specifically, as illustrated in FIG. 1, base 1 includes body 1b and lens mount 1c, and body 1b and lens mount 1c is provided with opening 1a into which lens 5 is inserted and attached. Annular frame 2 is provided between body 1b and lens mount 1c, and recess 2b through which protrusion 5b (see FIGS. 6A and 6B described later) provided on an outer peripheral surface of lens 5 is inserted is formed on an inner periphery of annular frame 2, and socket 3 is movably installed on body 1b.

Figure 2:
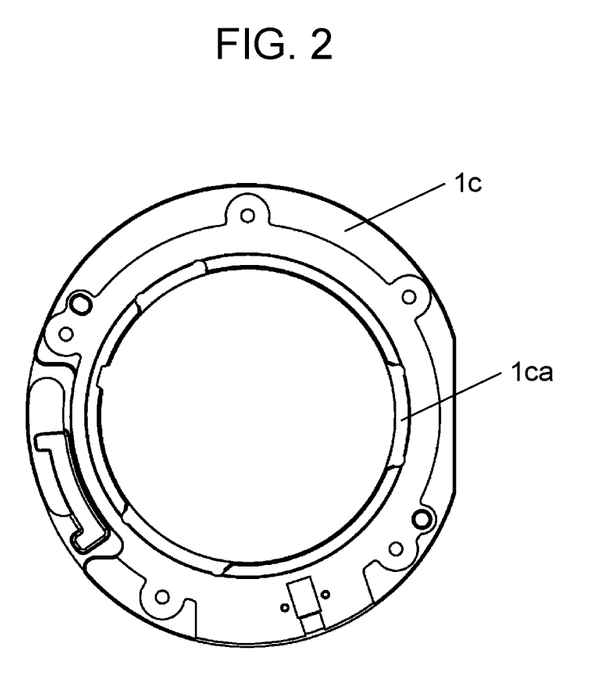
FIG. 2 is a plan view of a lens mount in a base as viewed from a left side in FIG. 1.

Further, as illustrated in FIG. 2, lens mount 1c is provided with groove 1ca accommodating protrusion 5b inserted through recess 2b of annular frame 2.

That is, in a state where socket 3 is not moved from the outer periphery toward the center, that is, the radial center of annular frame 2 by an elastic force of first elastic member 4, lens 5 is inserted and attached into base 1 from body 1b in FIG. 1 through opening 1a. Protrusion 5b provided on the outer peripheral surface of lens 5 is inserted through recess 2b provided on the inner periphery of annular frame 2, and then accommodated and engaged in groove 1ca provided in lens mount 1c, and thus lens 5 is smoothly mounted on base 1. At this time, lens contact 5a of lens 5 and socket contact 3a of socket 3 face each other with a gap between lens contact 5a and socket contact 3a.

Figure 4:
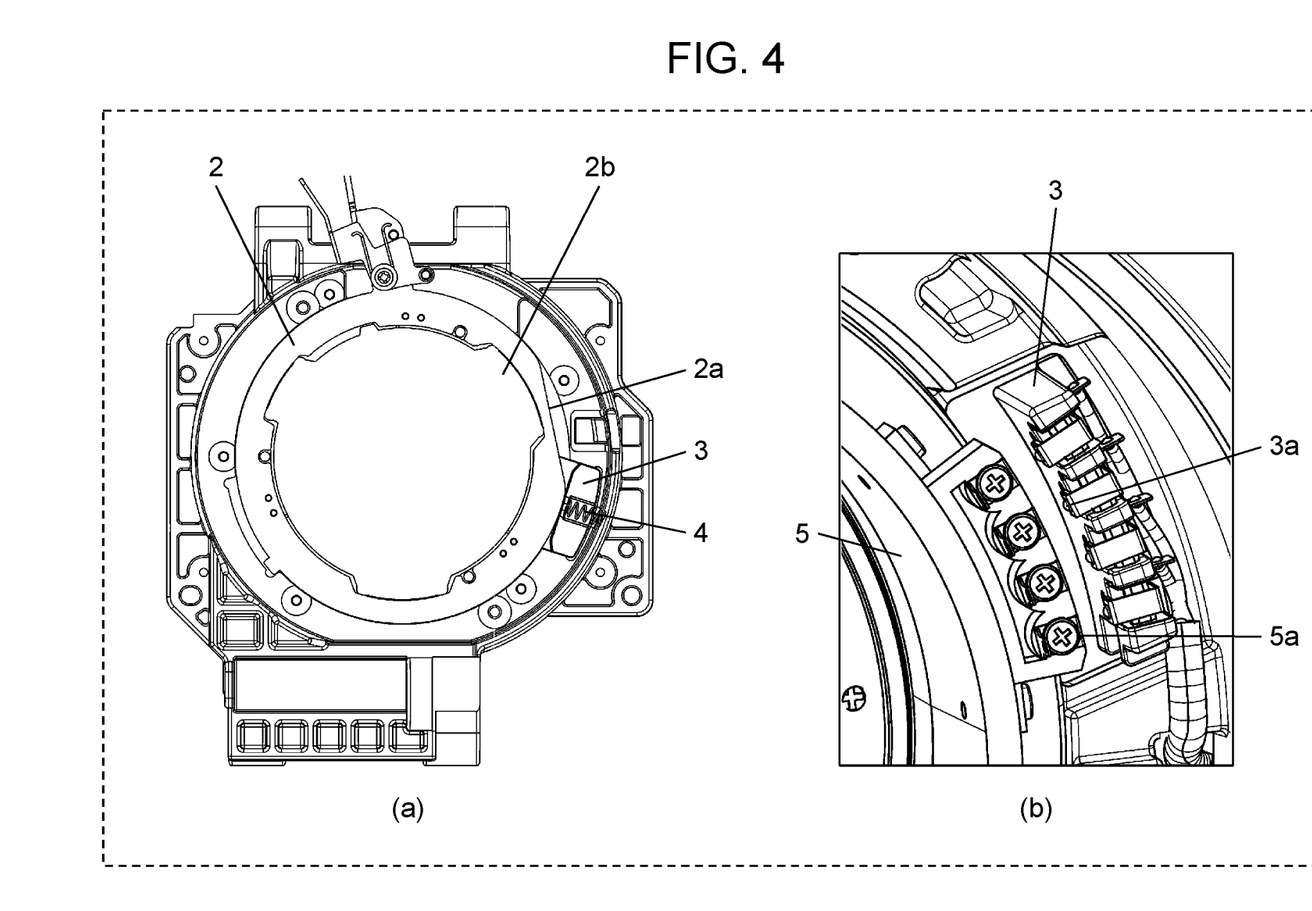
FIG. 4 is views illustrating a state of a socket before the annular frame is rotated to fix a lens. Part (a) of FIG. 4 is a plan view of the annular frame and a body in the base as viewed from a right side in FIG. 1, and part (b) of FIG. 4 is a view illustrating a state in which a socket contact and a lens contact are not electrically connected.

In the present disclosure, annular frame 2 is rotatably mounted on base 1, and rotates by a predetermined angle in one direction (for example, in a clockwise direction in part (a) of FIG. 4) to fix lens 5 inserted and attached into base 1.

Figure 3:
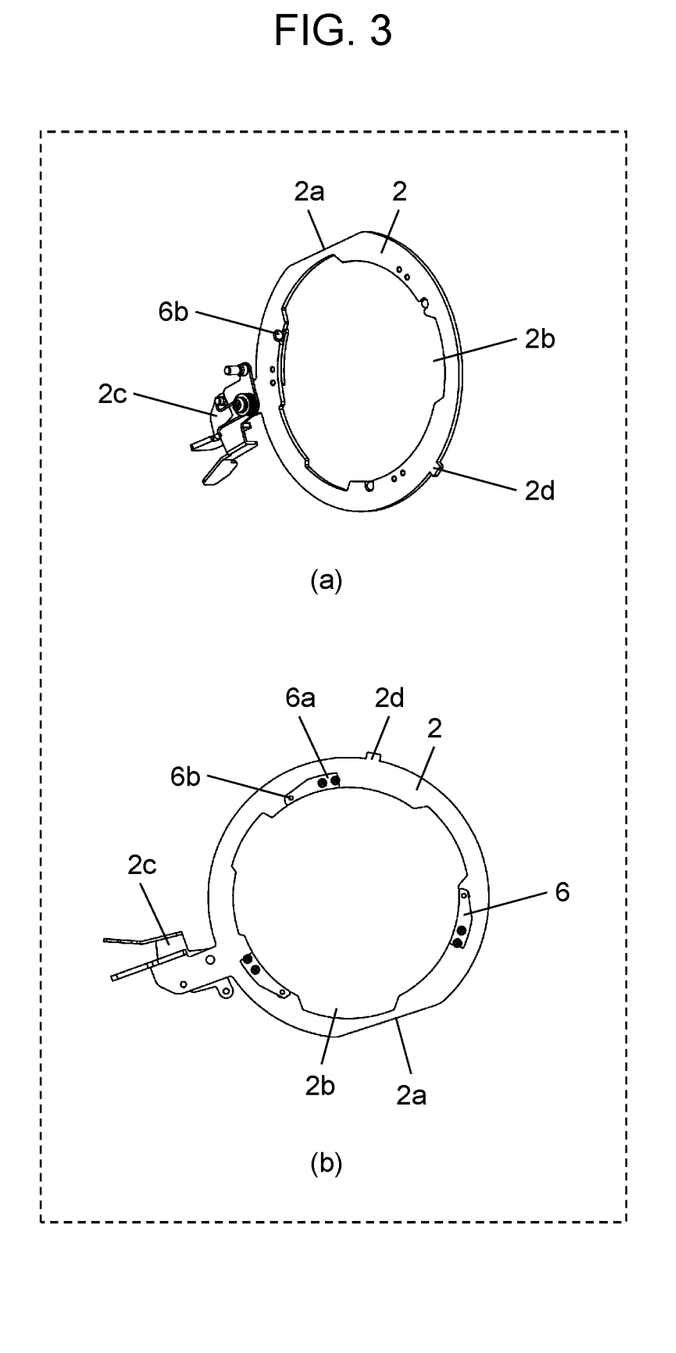
FIG. 3 is views illustrating an installation state between a second elastic member and an annular frame in FIG. 1. Part (a) of FIG. 3 is a perspective view, and part (b) of FIG. 3 is a plan view of the second elastic member and the annular frame as viewed from the left side in FIG. 1.

Specifically, as illustrated in FIGS. 1 and 3, second elastic member (for example, elastic piece) 6 that elastically abuts on protrusion 5b of lens 5 when the annular frame is rotated in one direction to urge lens 5 toward lens mount 1c in base 1 and fix lens 5 is provided at a position separated from one end of recess 2b of annular frame 2 by a predetermined distance.

In FIG. 3, first end 6a as a fixed end of second elastic member 6 is fixed to a side surface of annular frame 2 facing body 1b with a screw or the like, and second end 6b as an elastic end of second elastic member 6 is inserted through a through hole provided in annular frame 2 and protrudes from a side surface of annular frame 2 facing lens mount 1c. When annular frame 2 rotates in one direction, second end 6b elastically abuts on protrusion 5b of lens 5, urges lens 5 toward lens mount 1c in base 1, and thus fixes lens 5.

Second elastic member 6 of the present disclosure is not limited to an exemplary embodiment described above, and for example, second elastic member 6 may be configured by fixing an elastic body to the side surface of annular frame 2 facing lens mount 1c by means of adhesion, welding, or the like.

Hereinafter, a change of a non-electrically connected state and an electrically connected state between socket contact 3a and lens contact 5a of the present disclosure will be described with reference to FIGS. 4 and 5.

As illustrated in part (a) of FIG. 4, when annular frame 2 is rotated in the clockwise direction and lens 5 is not fixed, notch 2a of annular frame 2 is at a position not facing socket 3, and an arc of annular frame 2 abuts on socket 3 for socket 3 to compress first elastic member 4. Accordingly, as illustrated in part (b) of FIG. 4, socket contact 3a and lens contact 5a of lens 5 inserted and attached into base 1 face each other with a gap between socket contact 3a and lens contact 5a. That is, socket contact 3a and lens contact 5a are in the non-electrically connected state.

Figure 5:
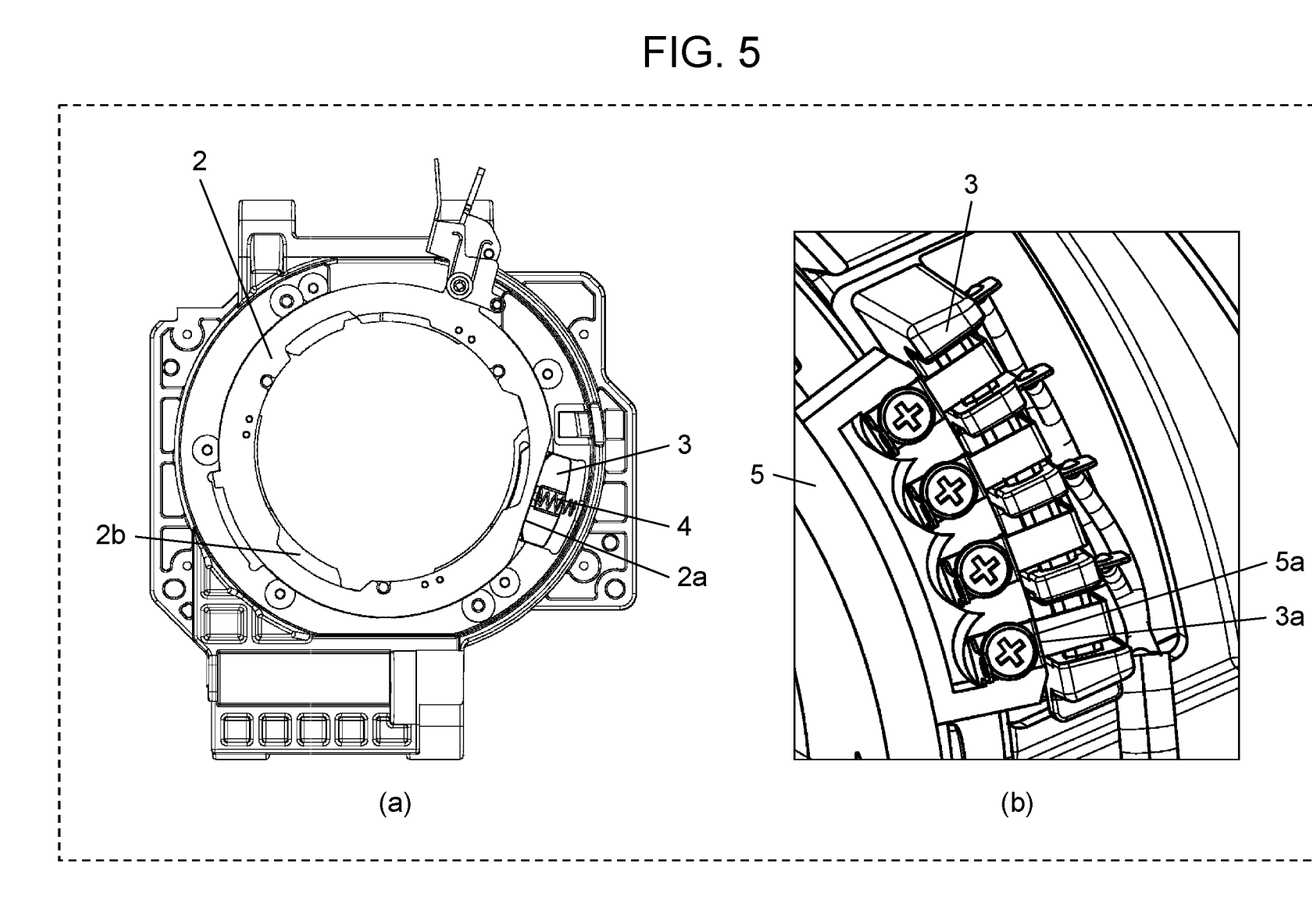
FIG. 5 is a view illustrating a state of the socket after the annular frame is rotated to fix the lens. Part (a) of FIG. 5 is a plan view of the annular frame and the body in the base as viewed from the right side of FIG. 1, and part (b) of FIG. 5 is a view illustrating a state in which the socket contact and the lens contact are electrically connected.

Furthermore, as illustrated in part (a) of FIG. 5, when annular frame 2 is rotated in the clockwise direction and second end 6b of second elastic member 6 elastically abuts on protrusion 5b of lens 5 to urge lens 5 toward lens mount 1c of base 1 and fixes lens 5 as described above, notch 2a rotationally moves to a position facing socket 3 in response to rotation of annular frame 2, and first elastic member 4 extends to urge socket 3 from the outer periphery toward the center, that is, the radial center of annular frame 2. As a result, socket 3 moves toward the center by a biasing force of first elastic member 4 and comes in contact with lens contact 5a of lens 5. As illustrated in part (b) of FIG. 5, socket contact 3a and lens contact 5a of lens 5 inserted and attached into base 1 face each other without a gap between socket contact 3a and lens contact 5a. That is, socket contact 3a and lens contact 5a are in the electrically connected state.

That is, in the present disclosure, socket contact 3a and lens contact 5a are in the non-electrically connected state when lens 5 is in a non-fixed state of not being fixed to base 1, but socket contact 3a and lens contact 5a are in the electrically connected state when lens 5 is in a fixed state of being fixed to base 1.

Thus, in the lens mounting apparatus of the present disclosure, first elastic member 4 is provided to urge socket 3 from the outer periphery toward the center, that is, the radial center of annular frame 2. That is, since socket 3 is radially movable by the biasing force of first elastic member 4, an effective stroke of socket contact 3a of socket 3 increases, and a contact failure rate at the contact decreases.

Further, since socket contact 3a of socket 3 and lens contact 5a of lens 5 are not in contact with each other when lens 5 is inserted, socket contact 3a of socket 3 can be prevented from being deformed by receiving an impact.

Furthermore, since socket 3 does not affect positioning of lens 5, a position of lens 5 can be determined appropriately.

In addition, since lens 5 need not be rotated after the insertion of lens 5, a mounting operation of lens 5 is convenient, and mounting operability is improved particularly for a lens having a large weight.

Finally, since socket 3 is radially movable, the socket has small dimensions and costs low.

Figure 6A:
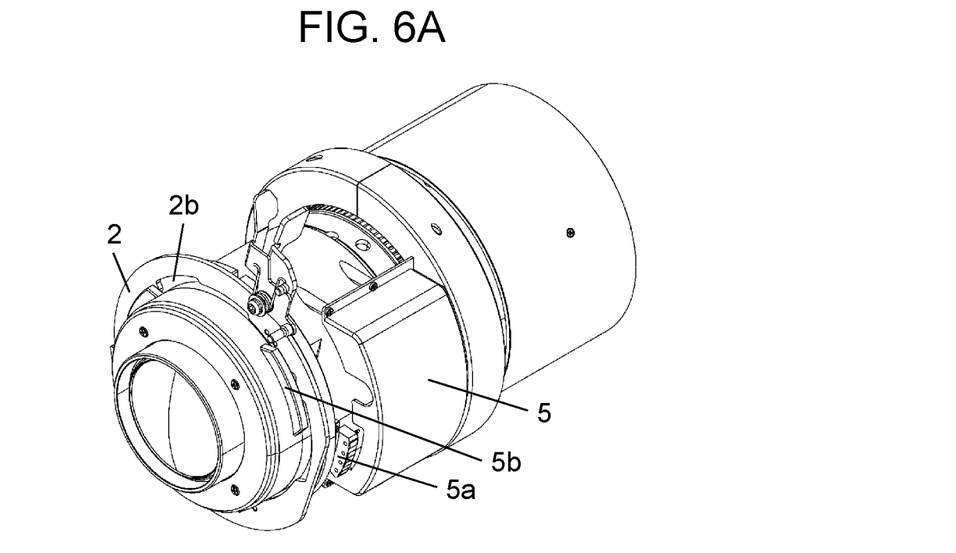
FIG. 6A is a perspective view of the lens and the annular frame, and is a view illustrating a state after the annular frame is rotated to fix the lens.

Hereinafter, an exemplary embodiment in a case where lens 5 is fixed to base 1 using annular frame 2 of the present disclosure will be described with reference to FIGS. 6A to 8B. The "lens" herein means not a lens itself as an optical element but a lens module mounted on a lens-interchangeable camera or projector and having a metal contact (connection part) as illustrated in FIG. 6A.

As described above, in the present disclosure, after lens 5 is inserted into base 1, lens 5 is fixed to base 1 by rotating annular frame 2 without rotating lens 5.

Specifically, as described above, lens 5 is inserted and attached into base 1 from body 1b in FIG. 1 through opening 1a. FIG. 6A is a perspective view of an installation state between lens 5 and annular frame 2 after protrusion 5b provided on the outer peripheral surface of lens 5 has inserted through recess 2b provided on the inner periphery of annular frame 2, and illustrates a state after annular frame 2 is rotated to fix lens 5.

Figure 6B:
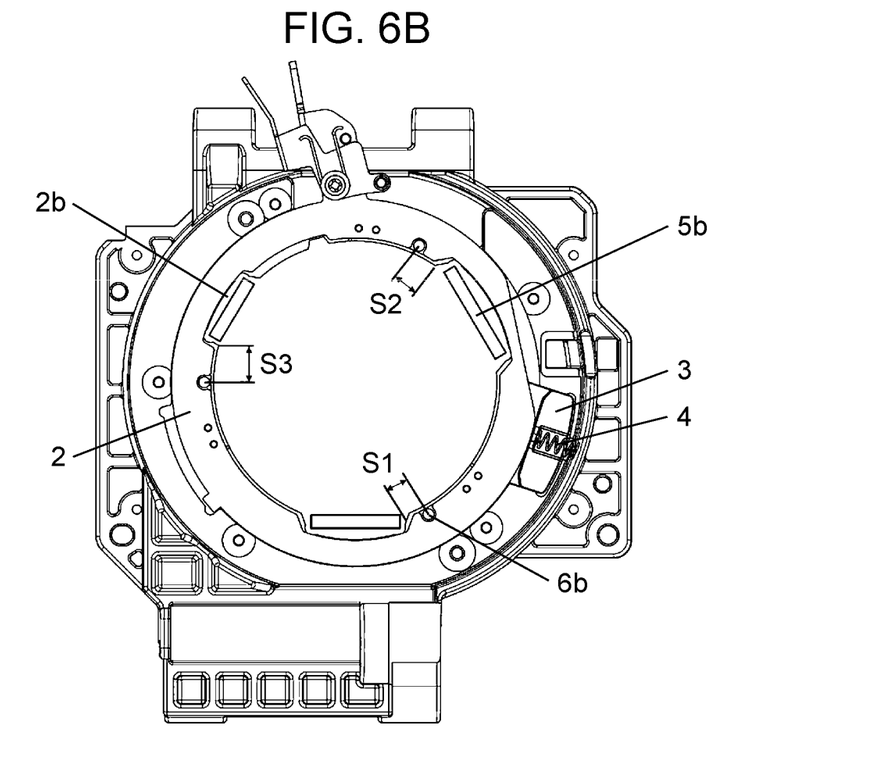
FIG. 6B is a view illustrating a positional relationship between the second elastic member and a protrusion before the annular frame is rotated to fix the lens, and is a plan view of the annular frame and the body in the base as viewed from the right side in FIG. 1.

On the other hand, FIG. 6B illustrates a positional relationship between second elastic member 6 and protrusion 5b before annular frame 2 is rotated to fix lens 5. FIG. 6B schematically illustrates only protrusion 5b provided on the outer peripheral surface of lens 5.

More specifically, a plurality of protrusions 5b of lens 5, a plurality of recesses 2b of annular frame 2, and a plurality of second elastic members 6 are provided correspondingly. For example, as illustrated in FIG. 6B, three protrusions 5b of lens 5, three recesses 2b of annular frame 2, and three second elastic members 6 are provided correspondingly.

A predetermined distance between one end (for example, an end downstream in the clockwise direction in FIG. 6B) of each recess 2b and each corresponding second elastic member 6 (in the present exemplary embodiment, second end 6b of each second elastic member 6) is different. That is, distances S1 to S3 are different from each other.

Preferably, as shown in FIG. 6B, distance S1, distance S2, and distance S3 between second ends 6b of second elastic members 6 and recesses 2b sequentially increase in a counterclockwise direction. That is, the predetermined distance between one end of each recess 2b and second end 6b of each corresponding second elastic member 6 is set for second end 6b of each second elastic member 6 and each corresponding protrusion 5b to elastically abut on each other sequentially when annular frame 2 is rotated in one direction (the clockwise direction). As a result, when annular frame 2 is rotated, second ends 6b of three second elastic members 6 sequentially come into elastic contact with three protrusions 5b instead of simultaneously coming into elastic contact with three protrusions 5b. Therefore, a rapid increase in resistance received when annular frame 2 is rotated can be prevented, and this resistance can be gradually increased. Thus, annular frame 2 can be smoothly rotated and prevented from being deformed or displaced.

Figure 7:
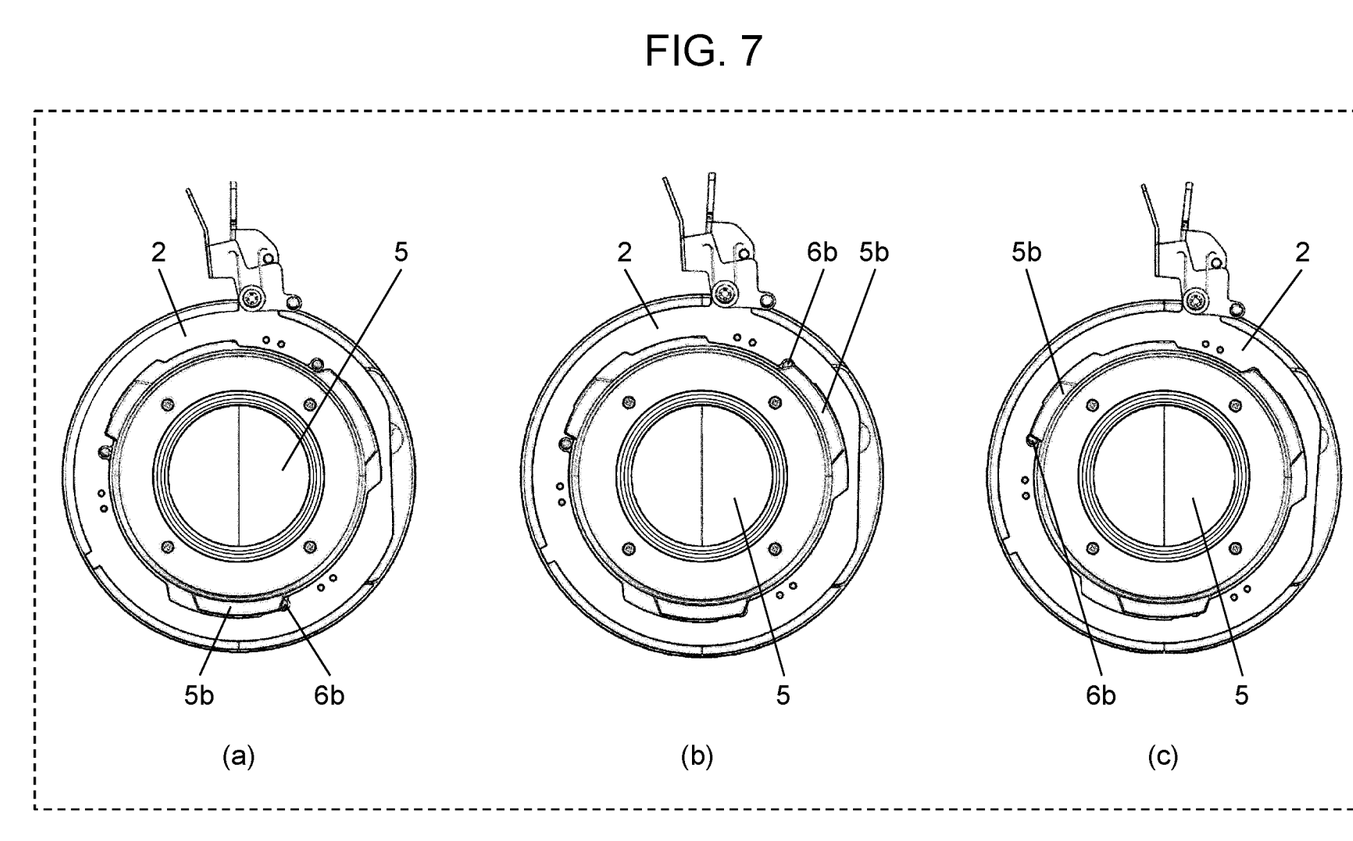
FIG. 7 is a schematic view illustrating that rotation of the annular frame causes the second elastic member to elastically abut on the protrusion of the lens sequentially to fix the lens.

FIG. 7 is a schematic view illustrating a state in which second end 6b of each of second elastic members 6 and corresponding protrusion 5b elastically abut on each other sequentially by rotating annular frame 2 in the clockwise direction from the state illustrated in FIG. 6B, for example.

As shown in FIG. 6B, distance S1, distance S2, and distance S3 between second ends 6b of second elastic members 6 and recesses 2b sequentially increase in the counterclockwise direction. Thus, when annular frame 2 is rotated in the clockwise direction, as shown in part (a) of FIG. 7, first, second end 6b of second elastic member 6 of a first group starts to elastically abut on corresponding protrusion 5b, and then, as shown in part (b) of FIG. 7, in response to the rotation of annular frame 2, second end 6b of second elastic member 6 of a second group starts to elastically abut on corresponding protrusion 5b. Finally, in response to the rotation of annular frame 2, as illustrated in part (c) of FIG. 7, second end 6b of second elastic member 6 of a third-group starts to elastically abut on corresponding protrusion 5b. As a result, annular frame 2 can be smoothly rotated by a predetermined angle, and lens 5 can be fixed to base 1. That is, distances S1 to S3 are set for the plurality of second elastic members 6 and the plurality of protrusions 5b to elastically abut on each other sequentially.

Note that, in the above description, rotating annular frame 2 to fix lens 5 means, for example, rotating annular frame 2 in one direction (in the above description, the direction is the clockwise direction, but may be the counterclockwise direction) by rotating operation lever 2c (see FIGS. 1, 3, and the like) provided at a location different from a location where notch 2a is formed on the outer periphery of annular frame 2.

Figure 8A:
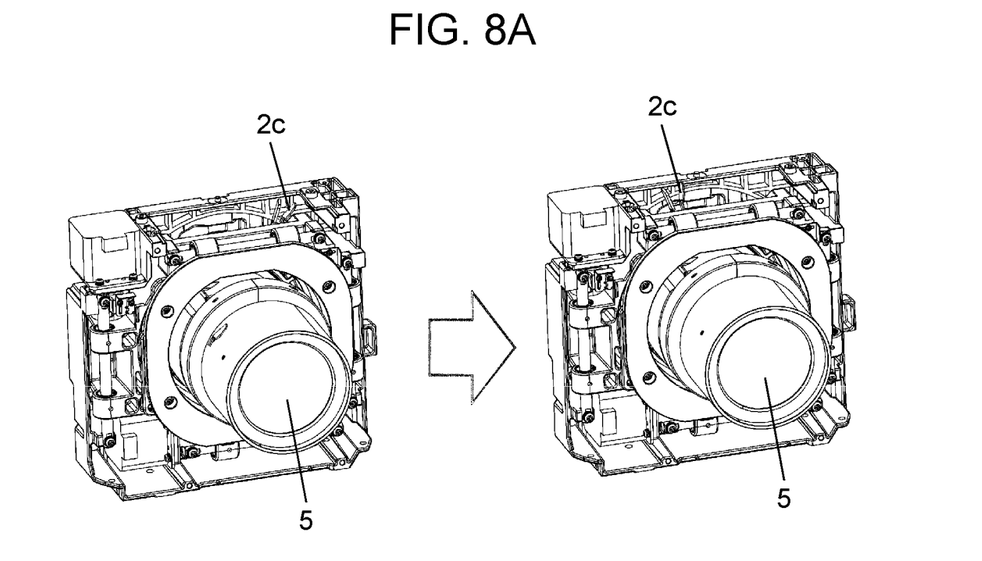
FIG. 8A is a schematic view illustrating that the lens changes from a non-fixed state to a fixed state.
Figure 8B:
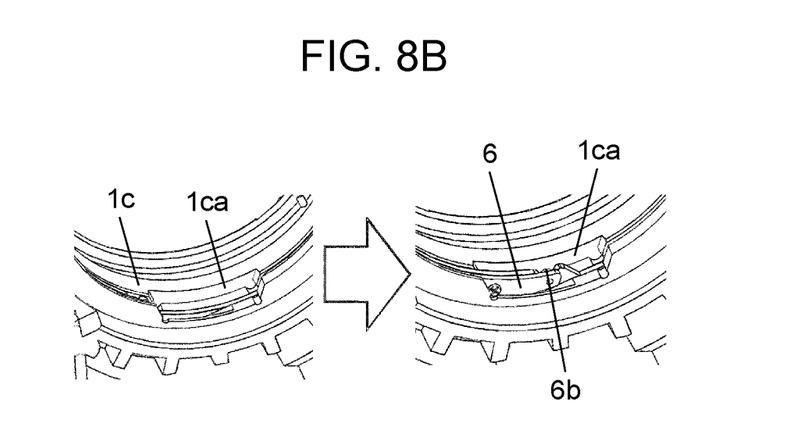
FIG. 8B is a schematic view illustrating a position change of the second elastic member before and after fixing the lens.

Next, a change from the non-fixed state to the fixed state of lens 5 will be described with reference to FIGS. 8A and 8B. FIGS. 8A and 8B are overall perspective views of the lens mounting apparatus including lens 5 of the present disclosure.

As described above, part (a) of FIG. 4, part (a) of FIG. 5, and FIG. 6B are plan views of annular frame 2 and body 1b of base 1 viewed from the right side in FIG. 1, whereas FIGS. 8A and 8B are perspective views of base 1, annular frame 2, and the like viewed from the left side in FIG. 1. Therefore, in FIGS. 8A and 8B, a rotation direction of annular frame 2 is the counterclockwise direction, unlike a rotation direction described above (that is, in the clockwise direction).

FIG. 8A is a schematic view of lens 5 changing from the non-fixed state to the fixed state.

In FIG. 8A, lens 5 changes from the non-fixed state to the fixed state by rotating operation lever 2c, for example, in the counterclockwise direction. At the same time, socket contact 3a of socket 3 and lens contact 5a of lens 5 are electrically connected.

FIG. 8B is a partial perspective view illustrating a position change of second elastic member 6 when lens 5 is changed from the non-fixed state to the fixed state. In FIG. 8B, lens 5 is not illustrated in order to describe the position change of elastic member 6. As illustrated in FIG. 8B, before lens 5 is fixed, second end 6b of second elastic member 6 does not abut on protrusion 5b of lens 5 provided in groove 1ca of lens mount 1c, but after lens 5 is fixed, second end 6b of second elastic member 6 abuts on protrusion 5b to fix lens 5.

Next, a change from the fixed state to the non-fixed state of lens 5 will be described with reference to FIG. 9. Corresponding to FIG. 8A, FIG. 9 is an overall perspective view of the lens mounting apparatus including lens 5 of the present disclosure.

As described above, in FIG. 8A, lens 5 changes from the non-fixed state to the fixed state by rotating operation lever 2c, for example, in the counterclockwise direction.

Figure 9:
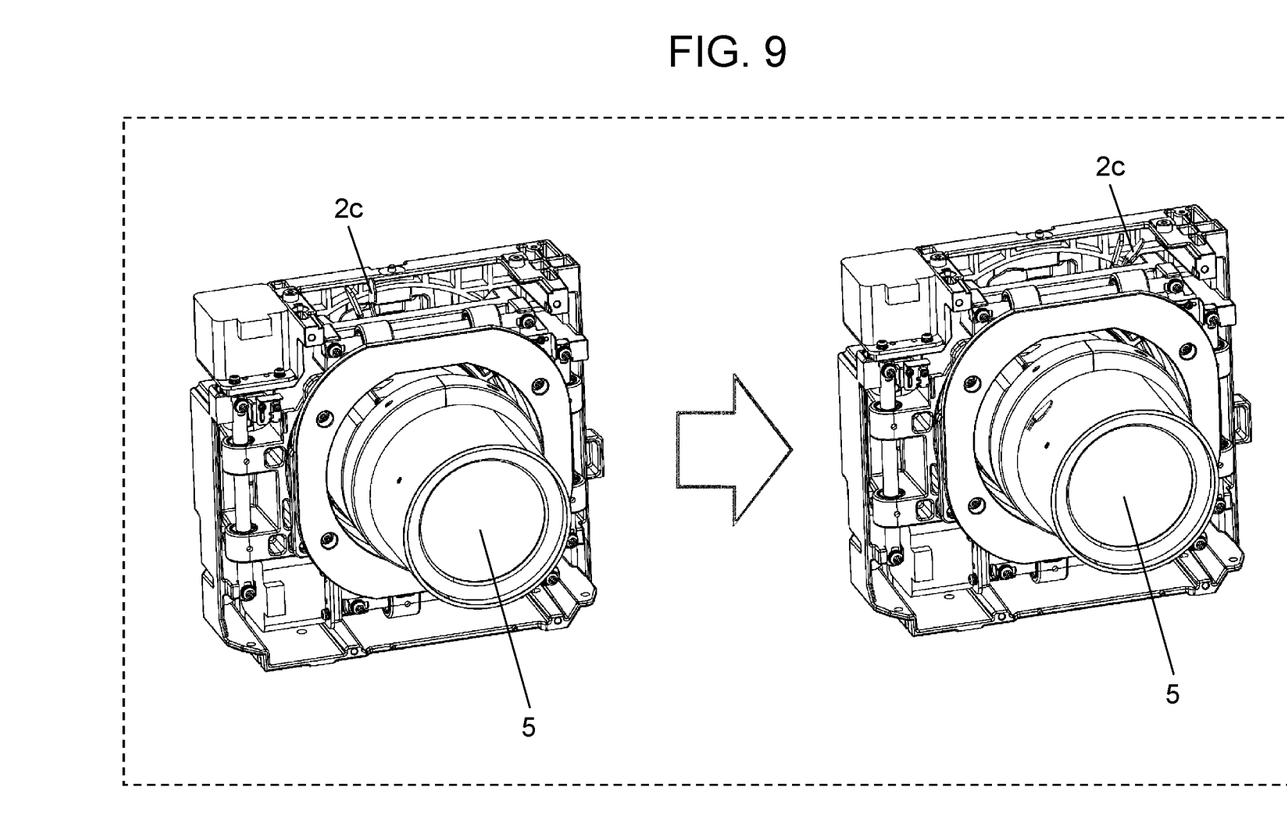
FIG. 9 is a schematic view illustrating that the lens changes from the fixed state to the non-fixed state.

On the other hand, for example, when lens 5 is switched from the fixed state to the non-fixed state to remove lens 5, operation lever 2c only has to be rotated, for example, in the clockwise direction as illustrated in FIG. 9. As a result, lens 5 changes from the fixed state to the non-fixed state. At the same time, the electrical connection between socket contact 3a of socket 3 and lens contact 5a of lens 5 is also released.

As described above, in the present disclosure, by rotating annular frame 2 by a predetermined angle in one direction (clockwise or counterclockwise direction), socket contact 3a and lens contact 5a are electrically connected to each other while lens 5 inserted and attached into base 1 is fixed. In addition, by rotating annular frame 2 by a predetermined angle in a direction opposite to one direction (counterclockwise or clockwise direction), the fixation of lens 5 inserted and attached into base 1 is released, and at the same time, the electrical connection between socket contact 3a and lens contact 5a is released.

Further, stopper 1ba that limits a rotation angle of annular frame 2 of the present disclosure will be described with reference to FIG. 10.

Figure 10:
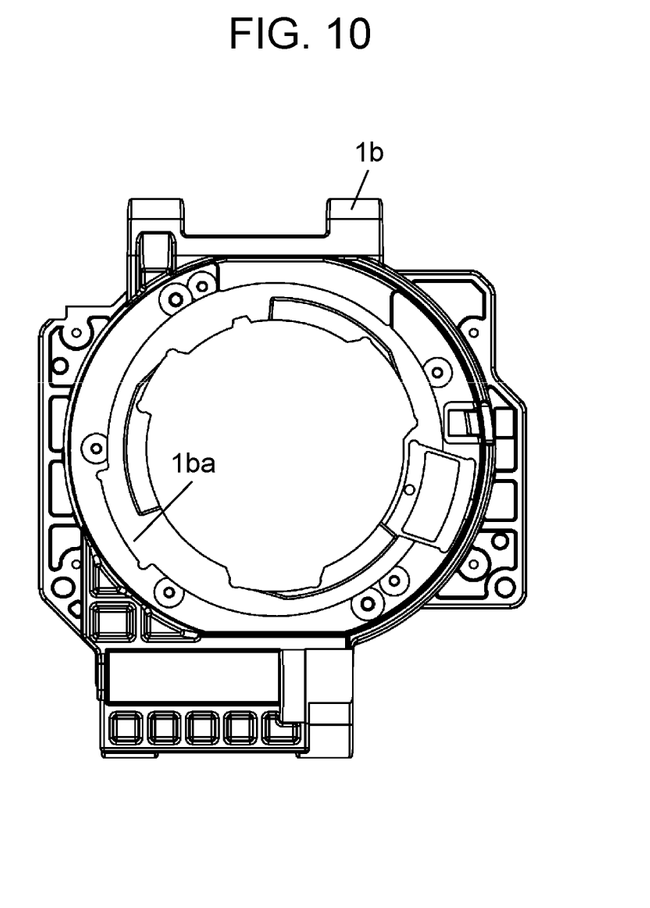
FIG. 10 is a plan view illustrating a stopper provided in the body in the base and configured to limit a rotation angle of the annular frame.

In FIG. 10, body 1b of base 1 is provided with stopper 1ba, and stopper 1ba is formed by providing a notch on an inner periphery of body 1b. As illustrated in FIGS. 1 and 3, projection 2d is provided at a location different from locations where notch 2a and operation lever 2c are provided on the outer periphery of annular frame 2. By inserting projection 2d into stopper 1ba, the rotation angle of annular frame 2 is limited to a predetermined angle at which projection 2d moves from one end to the other end in a circumferential direction of stopper 1ba.

A circumferential length of stopper 1ba only has to be larger than a maximum distance between second end 6b of second elastic member 6 and recess 2b, for example, above-described distance S3. By setting the circumferential length of stopper 1ba, the predetermined angle at which annular frame 2 rotates can be freely set.

FIG. 10 illustrates a case where stopper 1ba is provided on body 1b, but a position of stopper 1ba is not limited to this position, and of course, such a stopper may also be provided on lens mount 1c.

Next, each exemplary embodiment of notch 2a provided in annular frame 2 will be described with reference to FIG. 11.

Figure 11:
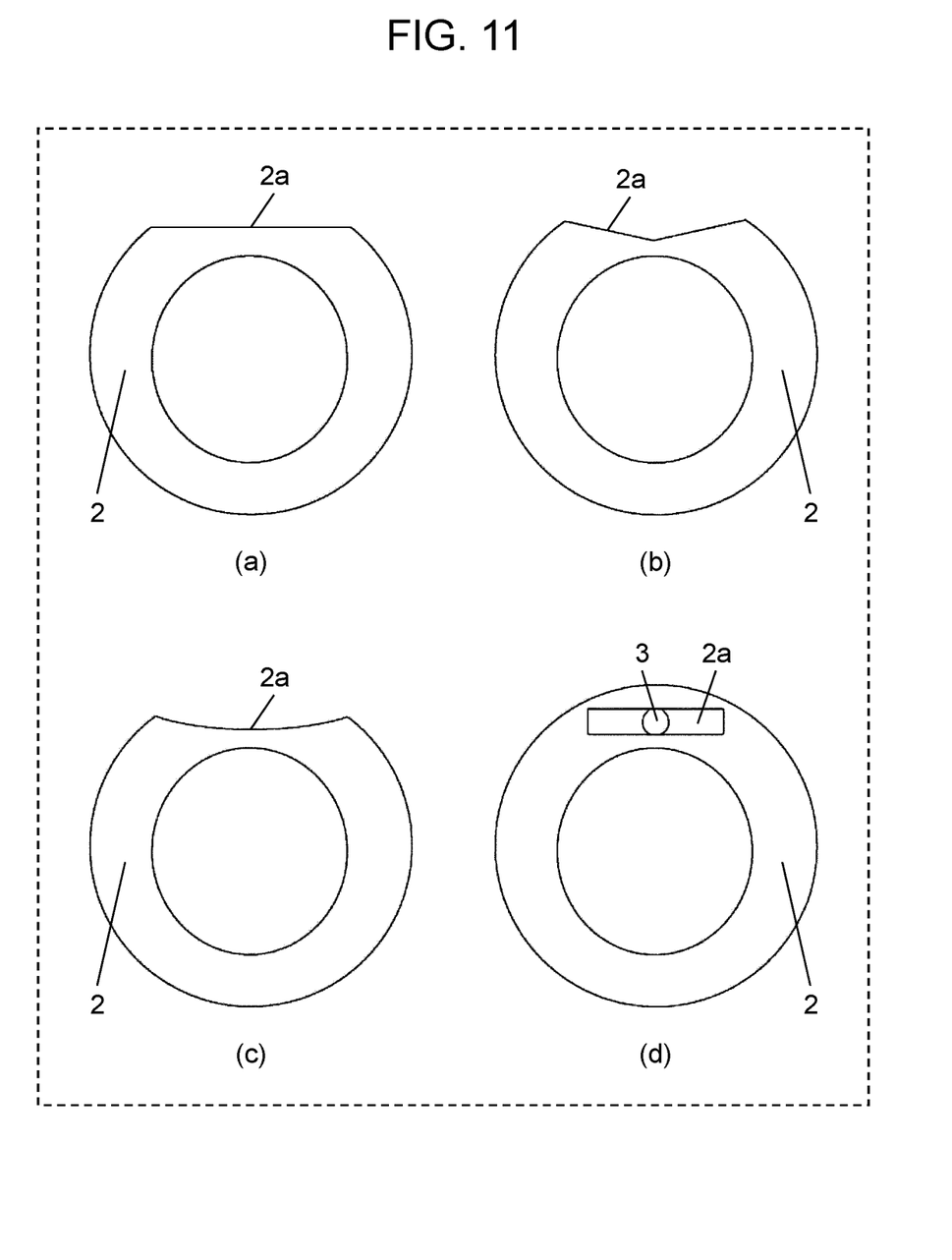
FIG. 11 is a schematic view of a notch provided on a part of an outer periphery of the annular frame in each exemplary embodiment.

Notch 2a of annular frame 2 illustrated in FIGS. 1, 3, and the like is a notch formed by linearly cutting out the outer periphery of annular frame 2 as illustrated in part (a) of FIG. 11, but may be a notch having a bent-line shape as illustrated in part (b) of FIG. 11 or a notch having an arcuate line shape as illustrated in part (c) of FIG. 11 other than the notch having a linear shape as illustrated in part (a) of FIG. 11. Further, as shown in FIG. 11(d), a linear notch can be provided between the inner periphery and the outer periphery of annular frame 2. In a case where socket 3 is provided in the notch as shown in part (d) of FIG. 11, when annular frame 2 rotates, socket 3 slides in the notch and moves radially.

Each notch shown in part (a) to part (d) of FIG. 11 can electrically connect socket contact 3a and lens contact 5a or release the electrical connection between socket contact 3a and lens contact 5a.

Finally, the projector of the present disclosure will be described with reference to FIG. 12.

The projector of the present disclosure is an electronic device that modulates a light flux emitted from a light source device in response to an image signal and magnifies and projects a resultant light flux onto a projection surface such as a screen. The projector includes the above-described lens mounting apparatus, the light source device that emits the light flux, and optical modulator that modulates the light flux emitted from the light source device in response to the image signal.

Figure 12:
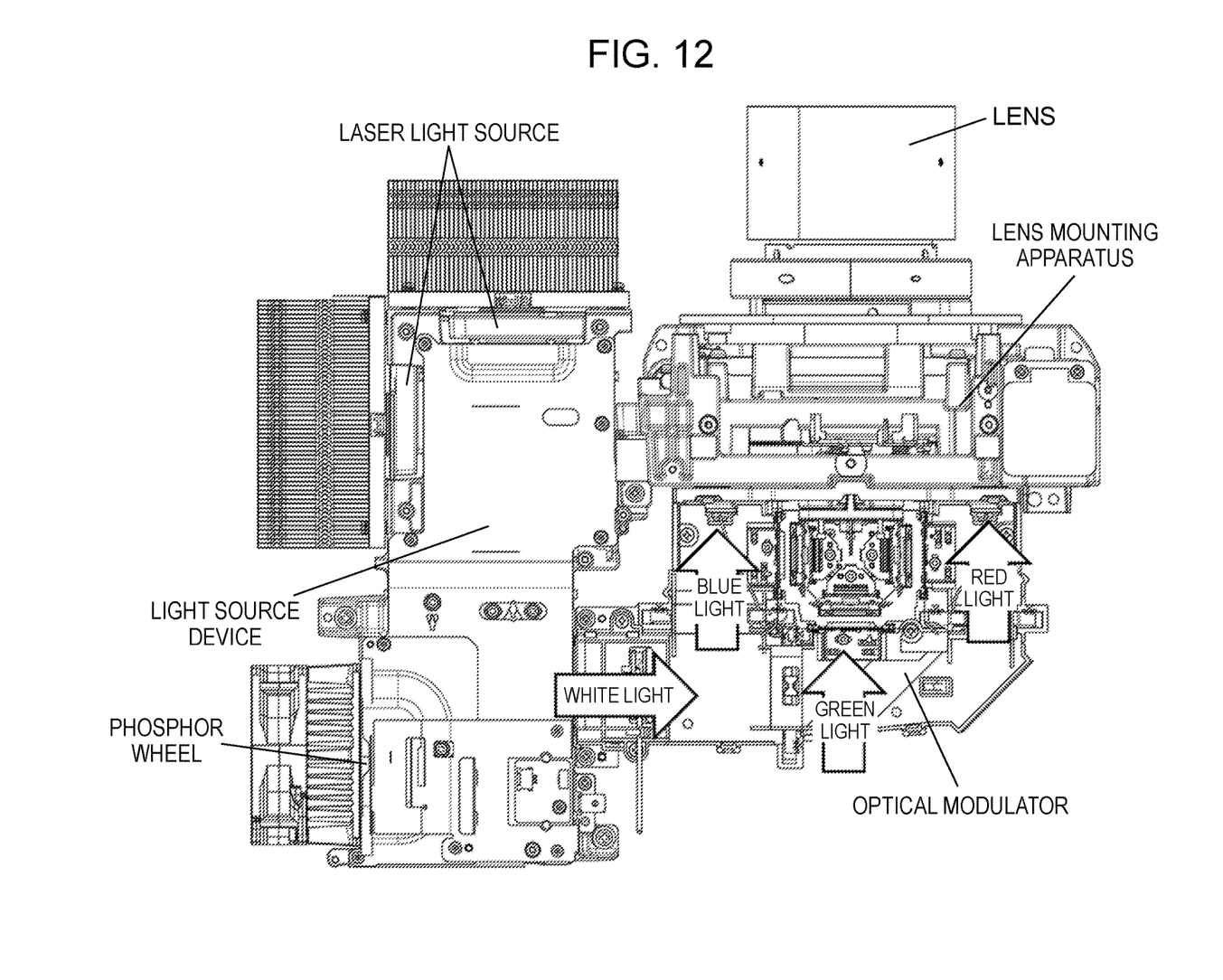
FIG. 12 is a plan view of a main part of a projector of the present disclosure.

Specifically, as illustrated in FIG. 12, in the projector of the present disclosure, the light source device includes a laser light source that emits blue laser light. A part of the blue laser light from the laser light source excites yellow phosphor of a phosphor wheel as excitation light to emit yellow fluorescence light, and yellow light is reflected from the phosphor wheel. The yellow light and the blue light of the blue laser light are synthesized at a constant ratio to become white light, and the white light is emitted from the light source device. The white light from the light source device is color-separated into red light, blue light, and green light by a dichroic mirror (not illustrated), and these red light, blue light, and green light are incident on the light modulator such as a liquid crystal panel. The light modulator modulates the red light, blue light, and green light in accordance with the image signal. The color lights modulated by the light modulator are synthesized by a light synthesizer (not illustrated) such as a prism and become projection image light. The projection image light is enlarged by the lens and then projected onto the projection surface.

Note that, in FIG. 12, since the above-described lens is the projection lens (lens 5) mounted on the projector by the above-described lens mounting apparatus, in the projector, it is possible to reduce a volume of the socket, suppress a contact failure of the socket contact, and improve the mounting operability of the lens.

The lens mounting apparatus and the projector of the present disclosure have been described above with reference to the specific exemplary embodiments illustrated in FIGS. 1 to 12.

As is clear from the above description, an object of the present disclosure is to provide a lens mounting apparatus capable of reducing a volume of a socket, suppressing a contact failure of a socket contact, and improving mounting operability of a lens. In order to achieve this object, the lens mounting apparatus of the present disclosure includes base 1 having opening 1a into which lens 5 is inserted and attached, annular frame 2 provided with notch 2a formed by notching a part of an outer periphery, socket 3 electrically connected to lens contact 5a as a connection part of lens 5, and first elastic member 4 provided to urge socket 3 from the outer periphery of annular frame 2 toward the center. Annular frame 2 is rotatably mounted on base 1, and is rotated by a predetermined angle in one direction to fix lens 5 inserted and attached into base 1. When lens 5 is not fixed by annular frame 2, notch 2a is located at a position not facing socket 3, and when lens 5 is fixed by annular frame 2, notch 2a is located at a position facing socket 3, and socket 3 is electrically connected to lens contact 5a of lens 5 by the urging force of first elastic member 4.

In the lens mounting apparatus of the present disclosure, since first elastic member 4 is provided to urge socket 3 from the outer periphery toward the center, that is, the radial center of annular frame 2, the effective stroke of socket contact 3a of socket 3 increases, and the contact failure rate at the contact decreases.

Further, since socket contact 3a of socket 3 and lens contact 5a of lens 5 are not in contact with each other when lens 5 is inserted, socket contact 3a of socket 3 can be prevented from being deformed by receiving an impact.

Furthermore, since socket 3 does not affect positioning of lens 5, a position of lens 5 can be determined appropriately.

In addition, since lens 5 need not be rotated after the insertion of lens 5, a mounting operation of lens 5 is convenient, and mounting operability is improved particularly for a lens having a large weight.

Finally, since socket 3 is radially movable, the socket has small dimensions and costs low.

It is preferable that recess 2b through which protrusion 5b provided on the outer peripheral surface of lens 5 is inserted is formed on the inner periphery of annular frame 2, and second elastic member 6 that elastically abuts on protrusion 5b and urges lens 5 toward base 1 when annular frame 2 is rotated in one direction is provided at a position separated from one end of recess 2b of annular frame 2 by a predetermined distance.

The plurality of protrusions 5b, the plurality of recesses 2b, and the plurality of second elastic members 6 are preferably provided correspondingly, and the predetermined distance between one end of each recess 2b and each corresponding second elastic member 6 is preferably different.

Furthermore, the predetermined distance between one end of each recess 2b and each corresponding second elastic member 6 is preferably set for each second elastic member 6 and each corresponding protrusion 5b to elastically abut on each other sequentially when annular frame 2 is rotated in one direction.

As a result, a rapid increase in resistance received when annular frame 2 is rotated can be prevented, and this resistance can be gradually increased. Thus, annular frame 2 can be smoothly rotated and prevented from being deformed or displaced.

It is preferable that base 1 includes body 1b and a lens mount 1c, annular frame 2 is provided between body 1b and lens mount 1c, lens 5 is inserted and attached into base 1 from body 1b, and second elastic member 6 elastically abuts on protrusion 5b and urges lens 5 toward lens mount 1c when annular frame 2 is rotated in one direction.

As a result, gravity of lens 5 is received by body 1b, and the gravity of lens 5 substantially does not act on lens mount 1c. Therefore, lens mount 1c need not have high hardness and may include an inexpensive material, which leads to cost reduction.

Lens mount 1c is preferably provided with groove 1ca accommodating protrusion 5b inserted through recess 2b.

Consequently, lens 5 can easily be mounted on base 1 using groove 1ca.

Base 1 is preferably provided with stopper 1ba that limits the rotation angle of annular frame 2 to a predetermined angle.

Thus, by setting the circumferential length of stopper 1ba, the predetermined angle at which annular frame 2 rotates can be freely set.

By rotating annular frame 2 by a predetermined angle in a direction opposite to the one direction, it is preferable that the fixation of lens 5 and the electrical connection between socket contact 3a of socket 3 and lens contact 5a of lens 5 can be released.

Thus, lens 5 can be removed from base 1 by a simple operation of rotating annular frame 2 in a direction opposite to the one direction.

Further, the present disclosure provides the projector including the above-described lens mounting apparatus.

In the projector of the present disclosure, lens 5 is mounted by the above-described lens mounting apparatus, and thus effects similar to effects of the above-described lens mounting apparatus can be obtained.

Although the present disclosure has sufficiently described the preferred exemplary embodiments with reference to the drawings as described above, those skilled in the art will obviously make appropriate modifications or changes on the basis of the above exemplary embodiments. Such modifications or changes are considered to be included in the scope of protection of the present disclosure unless deviating from the gist of the present disclosure.

What is claimed is:

1. A lens mounting apparatus comprising:
   a base including an opening, wherein a lens including a connection part is inserted and attached into the opening of the base; and
   a frame including a notch provided on a part of an outer periphery of the frame, wherein
   the frame is rotatably mounted on the base,
   the frame is configured to fix the lens inserted and attached into the base by rotating the frame in one direction by a predetermined angle,
   the frame includes a recess on an inner periphery of the frame,
   a protrusion provided on an outer peripheral surface of the lens is inserted through the recess of the frame,
   the lens mounting apparatus further comprises an elastic member at a position separated by a predetermined distance from one end of the recess of the frame, the elastic member elastically abutting on the protrusion and urging the lens toward the base when the frame is rotated in the one direction,
   a plurality of the protrusions, a plurality of the recesses, and a plurality of the elastic members are provided correspondingly, and
   a plurality of the predetermined distances are different from each other.

2. The lens mounting apparatus according to claim 1, wherein the plurality of predetermined distances are set for the plurality of elastic members and the plurality of protrusions to elastically abut on each other sequentially when the frame is rotated in the one direction.

3. The lens mounting apparatus according to claim 1, wherein
   the base includes a body and a lens mount,
   the frame is provided between the body and the lens mount,
   the lens is inserted and attached into the base from the body, and
   the elastic member elastically abuts on the protrusion and urges the lens toward the lens mount when the frame is rotated in the one direction.

4. The lens mounting apparatus according to claim 3, wherein the lens mount includes a groove that accommodates the protrusion inserted through the recess.

5. The lens mounting apparatus according to claim 1, wherein the base includes a stopper that limits a rotation angle of the frame to the predetermined angle.

6. The lens mounting apparatus according to claim 1, further comprising a socket electronically connected to the connection part of the lens,
   wherein by rotating the frame by the predetermined angle in a direction opposite to the one direction, the frame is configured to release fixation of the lens and release an electrical connection between the socket and the connection part of the lens.

7. A projector comprising the lens mounting apparatus according to claim 1.

8. The lens mounting apparatus according to claim 1, further comprising:
   a socket electrically connected to the connection part of the lens; and
   a second elastic member provided to urge the socket from the outer periphery toward a center of the frame, wherein
   when the frame does not fix the lens, the notch does not face the socket, and
   when the frame fixes the lens, the notch faces the socket, and the socket is electrically connected to the connection part of the lens by an urging force of the second elastic member.

* * * * *